Oct. 3, 1961
A. S. MYERS, JR
3,003,067
PULSE COUNTERS
Filed Feb. 18, 1959
2 Sheets-Sheet 1
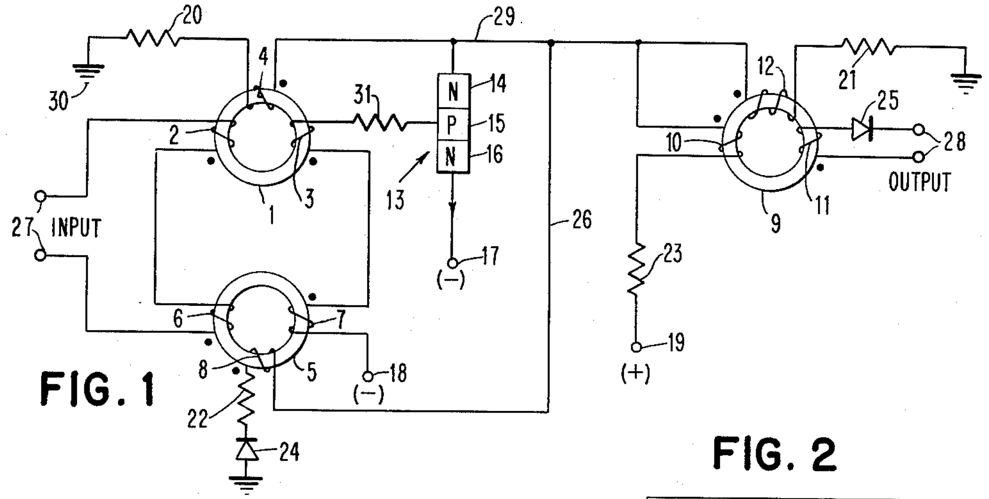
FIG. 1
FIG. 2
| PULSES | | 1 | | 2 | |
|---|---|---|---|---|---|
| CORE 1 | 0 | 1 | 0 | 1 | 0 |
| CORE 5 | 0 | 1 | 1 | 0 | 0 |
| CORE 9 | 0 | 0 | 0 | 1 | 0 |
FIG. 3
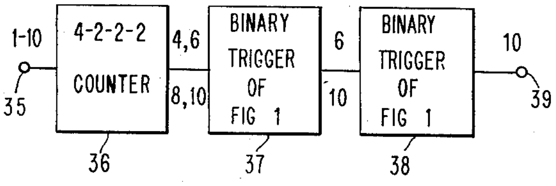
| PULSE | | 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|---|
| CORE 40 | 0 | 1 | 0 | 1 | 0 | 1 | 0 | 1 | 0 | 1 | 0 | 1 | 0 | 1 | 0 | 1 | 0 | 1 | 0 | 1 | 0 |
| CORE 44 | 0 | 1 | 1 | 0 | 0 | 1 | 1 | 0 | 0 | 1 | 1 | 0 | 0 | 1 | 1 | 0 | 0 | 1 | 1 | 0 | 0 |
| CORE 48 | 0 | 0 | 0 | 1 | 0 | 0 | 0 | 1 | 0 | 0 | 0 | 1 | 0 | 0 | 0 | 1 | 0 | 0 | 0 | 1 | 0 |
| CORE 52 | 0 | 0 | 0 | 1 | 1 | 1 | 1 | 1 | 1 | 1 | 1 | 1 | 1 | 1 | 1 | 1 | 1 | 1 | 1 | 0 | 0 |
| CORE 56 | 0 | 0 | 0 | 0 | 0 | 0 | 0 | 1 | 0 | 0 | 0 | 1 | 0 | 0 | 0 | 1 | 0 | 0 | 0 | 1 | 0 |
| CORE 60 | 0 | 0 | 0 | 0 | 0 | 0 | 0 | 1 | 1 | 1 | 1 | 0 | 0 | 0 | 0 | 1 | 1 | 1 | 1 | 0 | 0 |
| CORE 64 | 0 | 0 | 0 | 0 | 0 | 0 | 0 | 0 | 0 | 0 | 0 | 1 | 0 | 0 | 0 | 0 | 0 | 0 | 0 | 1 | 0 |
| CORE 68 | 0 | 0 | 0 | 0 | 0 | 0 | 0 | 0 | 0 | 0 | 0 | 1 | 0 | 0 | 0 | 0 | 0 | 0 | 0 | 1 | 0 |
| CORE 72 | 0 | 0 | 0 | 0 | 0 | 0 | 0 | 0 | 0 | 0 | 0 | 1 | 1 | 1 | 1 | 1 | 1 | 1 | 1 | 0 | 0 |
| CORE 76 | 0 | 0 | 0 | 0 | 0 | 0 | 0 | 0 | 0 | 0 | 0 | 0 | 0 | 0 | 0 | 0 | 0 | 0 | 0 | 1 | 0 |
FIG. 5
INVENTOR
AURIE S. MYERS JR.
BY [signature]
ATTORNEY Oct. 3, 1961 A. S. MYERS, JR 3,003,067

PULSE COUNTERS

Filed Feb. 18, 1959 2 Sheets-Sheet 2

United States Patent Office 3,003,067

Patented Oct. 3, 1961

3,003,067
PULSE COUNTERS

Aurie S. Myers, Jr., Poughkeepsie, N.Y., assignor to International Business Machines Corporation, New York, N.Y., a corporation of New York Filed Feb. 18, 1959, Ser. No. 794,078
10 Claims. (Cl. 307—88)

This invention relates to pulse counters, and more particularly to such counters utilizing solid state circuit elements as the principal components thereof.

Solid state electronic components, e.g., transistors and square hysteresis loop magnetic cores, have gained considerable favor because of their small size, long life, and low power requirements as compared to vacuum tubes. These advantages are particularly important in computing systems where space is at a premium and heat dissipation of major concern.

In patent applications Serial Number 794,169 for Ring Circuits and Serial Number 794,135 for Self Propagating Core Logic Circuits, of Aurie S. Myers, Jr., filed concurrently herewith, various circuits using transistors and magnetic cores are shown and described. The present invention is directed to pulse counting circuits employing such devices.

Accordingly, it is an object of this invention to provide a novel circuit for producing a single pulse output in response to a predetermined number of input pulses.

It is another object of this invention to provide a novel pulse counter making use of transistors and magnetic cores.

Still another object of this invention is to provide a novel binary trigger utilizing transistors and magnetic cores.

A further object of this invention is to provide a decimal counter consisting of a number of binary triggers interconnected in a novel manner.

The magnetic cores used in this invention are made of material having a square hysteresis loop. Such materials exhibit substantial magnetic remanence when driven to saturation in either direction. Thus, such a core is capable of assuming either of two stable conditions upon application of sufficient magnetizing current to an input winding coupled thereto. The direction of current flow will determine which of the two stable states the core will assume and the core may be switched from one state to the other by a flow of current through the winding in the proper direction. A potential will be induced in an output winding magnetically coupled to the core when the core is switched between states.

More specifically, the binary trigger of the instant invention comprises a pair of magnetic cores having their respective input windings connected to each other in series and so arranged that current flow through the windings will tend to drive both their respective cores to saturation in the same direction. The output windings of the pair of cores are also connected in series but are wound in opposite sense so that voltages induced therein will tend to buck or cancel each other. The series connected output windings are connected to the input of an amplifier, preferably of the semi-conductor type, the output of which is connected to the input of a third magnetic core. A direct current source is also provided and is connected to additional windings associated with one of said pair of cores and the third core in such manner as to continuously tend to drive these cores to saturation in a predetermined direction. The amplifier output is also connected to an additional winding on the other core of the pair. In the quiescent or non-operating condition, all the cores are saturated in one direction, which may be called the "0" state, and the amplifier is biassed off. A first input pulse applied to the series connected input windings of the core pair will drive both cores from the "0" state to saturation in the opposite direction, which will be called the "1" state. By virtue of the bucking relationship of the serially connected output windings, the voltages induced therein cancel one another and the amplifier input remains unaffected. At the termination of the input pulse, one of the cores is driven back to its "0" condition by the direct current supplied to its additional winding, while the other core remains in its "1" state. A second pulse can now switch only one of the cores to a "1" state and the potential induced in its output winding will turn on the amplifier. The amplifier output switches the third core from an "0" to a "1," producing a pulse in its output winding. A part of the amplifier output is also applied to the additional winding of the core not affected by the direct current source to drive it back to the "0" state. Thus a pair of input pulses produces a single output pulse. After the output pulse terminates, the direct current source returns the remaining cores to the "0" condition to await the next pair of input pulses.

A decimal counter can be produced by cascading three of the novel binary triggers, and adding an additional core to the first of the stages to make it a 4–2–2–2 counter, as will be described more fully hereinafter.

Other objects of the invention will be pointed out in the following description and claims and illustrated in the accompanying drawings, which disclose, by way of example, the principle of the invention and the best mode, which has been contemplated, of applying that principle.

In the drawings:

FIG. 1 is a schematic diagram of the binary trigger circuit of this invention;

FIG. 2 is a table explaining the operation of the circuit of FIG. 1;

FIG. 3 is a block diagram of the decimal counter of this invention;

FIG. 5 is a table explaining the operation of the circuit of FIG. 4.

*FIGURE 1*

Figure 4:
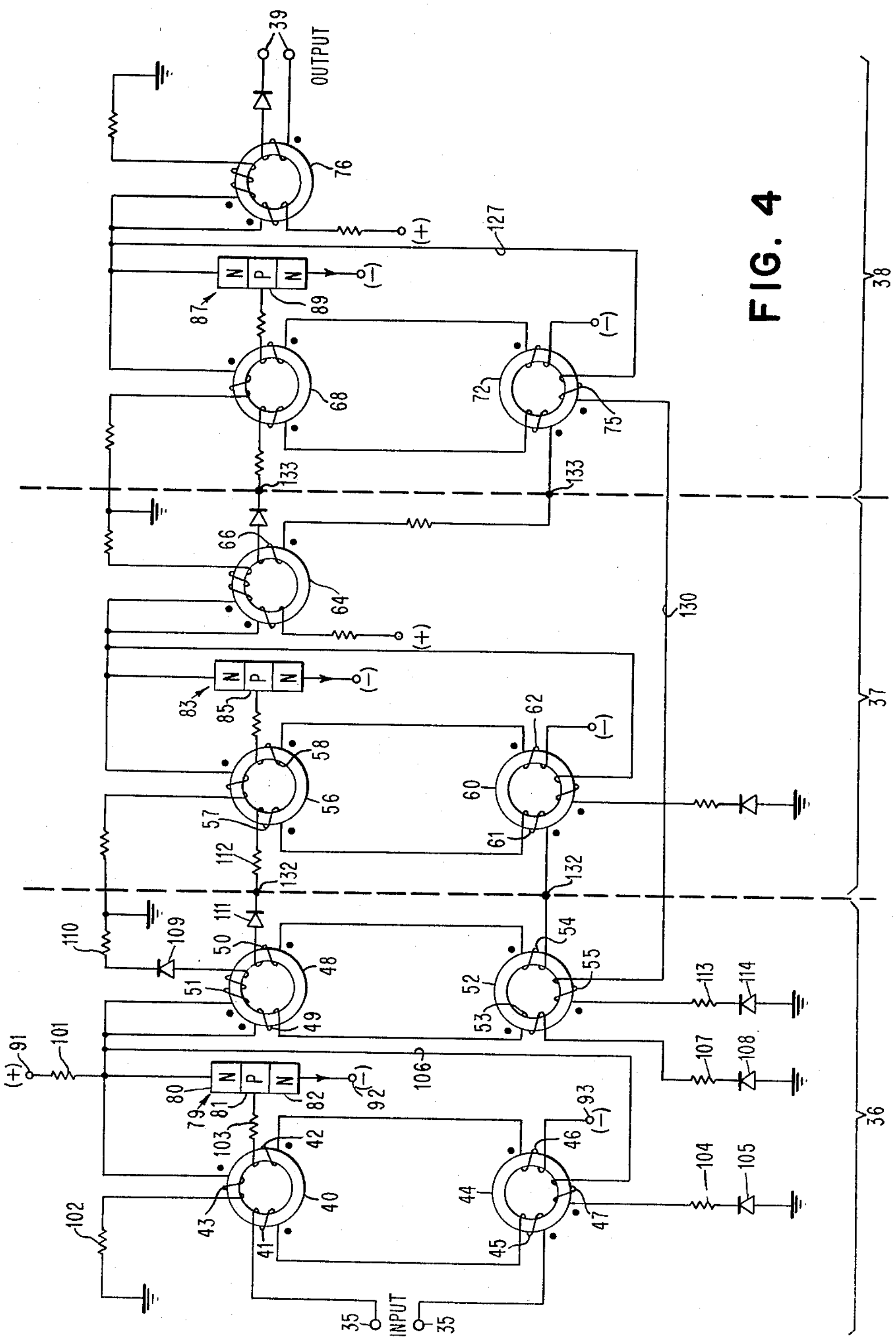
FIG. 4 is a schematic diagram of the decimal counter represented in block form in FIG. 3.

Referring now to the drawings, FIG. 1 illustrates the binary trigger or counter of the invention. Magnetic core elements 1, 5 and 9 may be made of any well known material exhibiting square hysteresis loop characteristics, such as a ferrite composition. Input, output, and additional windings, 2, 3, and 4 respectively, are inductively coupled to the core 1. Similarly, core 5 has its input winding 6, output winding 7 and additional winding 8 and core 9 has input winding 10, output winding 11 and additional winding 12. The dots associated with each of the windings indicates terminals of like polarity, in accordance with standard transformer notation.

The input windings 2 and 6 of cores 1 and 5 respectively, are connected in series across the input terminals 27. As can be seen from the placement of the dots, these windings are so oriented that voltages induced therein will be additive. This may be termed a series aiding relationship. Output windings 3 and 7 are also connected in series; however, as the placement of the dots indicate, their relationship is substractive or series backing. The lower terminal of winding 7 is returned to the negative pole 18 of a source of potential.

Winding 3 has its upper end connected through limiting resistor 31 to the base 15 of transistor 13, which in the embodiment shown, is of the NPN junction type. Emitter 16 of the transistor is connected to negative terminal 17 of a source of potential and collector 14 is tied through lead 29, input winding 10 on core 9, and resistor 23 to positive terminal 19 of a potential source. Transistor 13, it will be recognized, is connected in the familiar common emitter amplifier configuration. It is to be understood that any suitable amplifier arrangement may be used.

Conductor 29 is also connected at one end through additional winding 4 on core 1 and resistor 20 to a point of reference potential 30 and at the other end through additional winding 12 of core 9 and resistor 21 to reference potential. Lead 26 is connected from conductor 29 through additional coil 8 of core 5, resistor 2, and diode 24 to reference potential. Output winding 11 of core 9 is coupled to output terminals 28, with a diode 25 interposed in one of the connections.

The table of FIG. 2 which indicates the state of each core prior to, during, and after each pulse, will be referred to in explaining the operation of the binary trigger of FIG. 1. As the name implies, this circuit will produce a single output pulse for every two pulses supplied to its input.

Prior to receipt of any pulses at the input, cores 1, 5 and 9 are all in the "0" state, the notation "0" being used to indicate saturation in one direction, which provides one of the cores' two stable states. This is indicated in the first column of FIG. 2. The potential at terminal 18 is selected to be slightly more negative than that at 17, thereby back-biassing the base-emitter junction of transistor 13 to maintain it non-conductive. As will be more fully discussed hereinafter, the current flow from positive potential terminal 19 through windings 4 and 12 tends to maintain cores 1 and 9, respectively, in the "0" state.

Polarization of the input windings of cores 1 and 5 is so arranged that the pulses to be counted will switch these cores from their "0" state to their other stable condition or "1" state. Accordingly, the first pulse applied to terminals 27 will switch both cores 1 and 5 from the "0" to the "1" state, since their input windings are connected in series aiding relationship and current will flow therethrough. During the switching action, the flux changes generated in the cores induce potentials in the respective output windings 3 and 7. However, these output windings are connected in series bucking relationship and are so proportioned that these induced voltages substantially cancel one another whereby no current flows through windings 3 and 7 and no change in potential at base 15 of transistor 13 occurs. At the termination of the initial pulse, therefore, cores 1 and 5 are in their "1" state, core 9 is in its "0" state and transistor 13 remains non-conductive. This is shown in the second column of the table of FIG. 2.

Immediately upon conclusion of the input pulse, core 1 begins to reset to its initial "0" state. This is effected by the current flowing through its additional winding from source 19. The impedance of this current path and the number of turns of winding 4 are so proportioned that sufficient ampere turns of flux are supplied to core 1 to completely reset it in the interval between successive input pulses. Source 19 also causes current flow through windigns 10 and 12 of core 9, which is already in the "0" state. Winding 10 is so oriented that current flow therethrough from source 19 tends to set core 9 to a "1." However, winding 12 is oppositely oriented, as shown by the dot notation, and consists of a sufficiently greater number of turns than winding 10 to render the net flux produced in the core in such direction as to maintain the core in its "0" state. Current does not flow from source 19 through additional winding 8 of core 5 because of the polarization of diode 24. Therefore, at some time prior to receipt of the second pulse, core 1 is reset to a "0," core 5 is in a "1" state, and core 9 is in its "0" state. This is shown in the third column of FIG. 2. Since no change of state has occured in core 9, no output has appeared at terminals 28.

The second pulse applied to input terminals 27 sets core 1 to its "1" state, inducing a potential across output winding 3. Core 5, already in its "1" state, is unaffected by the second pulse and no output appears across its winding 7. A net potential therefore, is produced across windings 3 and 7 which is of such polarity and magnitude as to make base 15 of transistor 13 positive with respect to its emitter 16. This renders the transistor conductive. In practice, it has been found that the potential applied to base 15 from winding 3 is of sufficient magnitude to drive the transistor quickly into its saturation condition.

Saturation of transistor 13 drives the potential at its collector 14 substantially to that of its base, which is negative with respect to reference potential. This affects current flow in four separate circuit paths. Whereas initially, current had been flowing from source 19, through windings 4 and 12 and resistors 20 and 21 to reference potential, the dropping of potential at collector 14 reverses the direction of current flow. Current now flows from reference potential through resistors 20 and 21, windings 4 and 12, and through transistor 13 to negative potential at 17. Current flow through the windings 4 and 12 is now in such direction as to tend to switch these cores to their "1" states. Current also flows from source 19 through winding 10 of core 9 and thence through transistor 13. As can be seen, this current flow through winding 10 is in such direction as to tend to switch the core 9 to a "1." Actually, this current is of sufficient magnitude to effect a rapid switching of the core. Lastly, conduction of the transistor establishes current flow from reference potential through diode 24, resistor 22, winding 8 and lead 26 to negative potential point 17. The flux generated by current through winding 8 is of such magnitude and direction as to reset core 5 to a "0." By virtue of the gain of the transistor amplifier, the current flowing in these four paths is of relatively high magnitude whereby switching of the cores is effected rapidly.

The switching of core 9 upon conduction of transistor 13 induces a potential across output winding 11. Diode 25, interposed between the winding 11, and output terminals 28, is so polarized as to permit current flow to a load connected at 28 while the core is switching from "0" to "1," but not when the core is being reset to "0." The fourth column of FIG. 2 indicates the conditions of the three cores at the termination of the second input pulse.

After the second input pulse has ended, potential is no longer induced in winding 3, dropping the potential at base 15, and transistor 13 ceases to conduct. Collector 14 goes positive and current flow from source 19 through windings 4 and 12 resumes its original direction. This drives their respective cores 1 and 9 back to their "0" states to await the next input pulse. No current flow is induced in output winding 11 of core 9 during the resetting of the core because of the diode 25 and current flow through windings 3 and 7 is similarly blocked by the base-emitter diode of the transistor 13. It is seen now, that all the cores have been returned to the "0" state and the circuit is ready for another cycle of operation.

By virtue of the amplification supplied by the transistor 13, several important operating advantages obtain. Firstlyy, the power available at the output terminals 28 is several times that necessary at 27 to drive the circuit. The branching factor, or ability to drive other circuits, is thereby enhanced. Secondly, by using the amplified output to switch core 9, more flux is generated in a shorter period of time and greater speed of operation results. Speed is further increased by the action of windings 4 and 12 during conduction of the transistor amplifier; winding 4 regeneratively assists the input pulse in the switching of core 1 and winding 12 adds to the switching effect of winding 10. Additional advantage is achieved by having the amplifier drive a core rather than the load directly. The output core 9 effectively isolates the load from the input cores 1 and 5, thereby keeping their switching characteristics substantially constant.

*FIGURE 3*

In FIG. 3, a block diagram of the novel decimal counter of the invention is illustrated. This counter, as will be more fully discussed in connection with FIG. 4, is made up of three stages. Stage 36 comprises essentially the binary trigger of FIG. 1, modified to produce an output pulse in response to the fourth, sixth, eighth and tenth pulses supplied to input terminal 35. Stages 37 and 38 are duplicate triggers each identical to that of FIG. 1; trigger 37 giving an output at the sixth and tenth input pulse, and trigger 38 generating an output at 39 at the tenth input pulse. It is thus possible to produce a decimal counter having only three stages, thereby effecting a savings in components and speed of operation.

*FIGURE 4*

Referring now to FIG. 4, the decimal counter is shown in schematic form. The dotted lines divide the circuit into the three stages of FIG. 3, as shown by the brackets at the bottom of the drawing. As is apparent from FIG. 4, stages 37 and 38 are each identical to the trigger of FIG. 1, while the first stage 36 is a modification thereof. The operation of this circuit can be more readily understood by referring to the table of core states of FIG. 5. In describing the operation of the circuit of FIG. 4, it is to be understood that the cores and transistors shown therein are similar to those of FIG. 1 and operate in like fashion.

Stage 36 of FIG. 4 comprises four cores 40, 44, 48 and 52, each of which has an input winding (41, 45, 49, 53), an output winding (42, 46, 50, 54), and an additional winding (43, 47, 51, 55). Transistor 79, shown as being of the NPN junction type has a collector 80, base 81, and emitter 82. Collector 80 is coupled to positive potential source 91 through resistor 101 and emitter 82 is tied to negative potential at 92. Source 91 is also coupled through resistor 101 and through two parallel paths to reference potential; one of these paths comprising winding 43 and series resistor 102, the other comprising winding 51, diode 109 and resistor 110 in series. Input windings 41 and 45 are connected in series between input terminals 35 and oriented to provide a series aiding relationship. Output windings 42, 46 are connected in series bucking relationship between negative potential at 93 and one of resistor 103, the other end of which is connected to base 81. Additional winding 47 of core 44 is coupled between the collector 80 of the transistor and the series combination of resistor 104 and diode 105 to reference potential.

Input windings 49 and 53 of cores 48 and 52 respectively are connected in series aiding relationship in a series circuit that goes from collector 80, through the windings, resistor 107 and diode 108 to reference potential. Output windings 50 and 54 of these cores are connected in series bucking relationship across output terminals 132, with diode 111 being interposed in the connection of winding 50 to one of the terminals 32. One terminal of winding 55 of core 52 is connected through the series combination of resistor 113 and diode 114 to reference potential. The other terminal of the winding is connected via conductor 130 to winding 75 of core 72 in stage 38. As noted above, stages 37 and 38 are each identical to the circuit of FIG. 1 and reference may be had to the description thereof for circuit details.

In the initial or quiescent state, all the cores of FIG. 4 are set to their "0" condition and all the transistors are held non-conducting by virtue of back biassing of the base-emitter junctions as described in connection with FIG. 1. The first input pulse applied from terminals 35 through input windings 41 and 45 sets both their respective cores 40 and 44 to a "1." The potentials induced in their output windings 42 and 46 cancel, however, by virtue of the series bucking relationship of the windings. Accordingly, no net potential appears at base 81 of transistor 79, and it remains non-conducting. After the pulse, current flowing from positive potential source 91 through resistor 101, winding 43 and resistor 102 to reference potential, resets core 40 to "0." Core 44 remain in its "1" state because of the blocking action of diode 105. The second pulse applied to cores 40 and 44 results in a net voltage across the outpue windings which is applied through current limiting resistor 103 to base 81 to render transistor 79 conducting. Conduction of the transistor regeneratively assists in the switching of core 40 and causes current flow from reference potential through resistor 104, winding 47 and conductor 106 to reset core 44 "0." It will be recognized that thus far the operation of the circuit is indentical to that of FIG. 1.

Conduction of transistor 79 also results in current flow from reference potential through diode 108, resistor 107 and input windings 53 and 49, thereby setting their respective cores 52 and 48 to the "1" state. No current however, is drawn through additional winding 51 on core 48 because of the blocking action of dode 109. This is to nsure that equal switching currents are supplied to both cores 48 and 52. Output windings 50 and 54 are oppositely poled and the potentials induced therein during switching of the respective cores cancel each other. The condition of the various cores at this time is noted under Pulse 2 in FIG. 5. After the second pulse has terminated, source 91 causes current flow through winding 43 and resistor 102 to reference potential and through winding 51, diode 109 and resistor 110 to reference potential. This resets the cores 40 and 48 to "0." Core 52 remains in the "1" state. It is seen that no potential at output terminals 132 of stage 36 has yet appeared.

The third input pulse finds both cores 40 and 44 in their "0" states and sets them both to "1." No output is produced and transistor 79 remains non-conductive, thereby leaving the remainder of the circuit unaffected. At the conclusion of the third pulse, core 40 is reset to "0." The fourth input pulse produces an output voltage across windings 42 and 46 to bias transistor 79 into conduction. This causes current flow from reference potential through diode 108, resistor 107, windings 53, 49 and transistor 79 to negative potential point 92. Core 48 is switched to a "1" while core 52, already at a "1" state, is unaffected. Accordingly, a net voltage appears across the terminals 132 providing a current flow in the circuit loop comprised of diode 111, limiting resistor 112 and windings 57, 61, 54 and 50. Thus, stage 36 has produced its first output pulse at the fourth pulse applied at its input.

Stages 37 and 38 are identical to the circuit of FIG. 1 and operate in like manner. Therefore, the following description will be limited to indicating the states of the various cores as successive input pulses are applied.

The output generated at terminals 132 in response to the fourth input pulse, provides the first input pulse to binary trigger stage 37. This sets core 60 to a "1," core 56 switches to "1," then reset to "0," and transistor 83 remains biassed off.

In stage 36, all cores except 52 are reset at the conclusion of the fourth input pulse; cores 40 and 48 by current flow through their additional windings 43 and 51 from source 91, and core 44 by conduction through winding 47 upon operation of the transistor. The fifth input pulse therefore, sets both cores 40 and 44 to "1" states, leaving transistor 79 and the remainder of the circuit unaffected. Again, core 40 is reset to "0" at the conclusion of the pulse. The sixth input pulse now biasses transistor 79 to conduction, setting core 48 to a "1." Since core 52 was already in its "1" state, a net voltage appears at terminals 132. This voltage then, provides the second input pulse to binary trigger stage 37. A potential is now developed across output windings 58 and 62 and is applied to base 85 to drive transistor 83 into conduction. An output pulse is thus developed across winding 66 of core 64, which provides at terminals 133, the first input pulse to binary trigger stage 38. In the manner described hereinbefore, cores 68 and 72 are set to "1" states, but produce no output potential at the base 89 of transistor 87. The states of the various cores during and after the sixth input pulse are shown in the twelfth and thirteenth columns of FIG. 5.

The seventh input pulse sets both cores 40 and 44 to a "1," thereby producing no net output and leaving the remainder of the circuit unaffected. The eighth input pulse produces an output at terminals 132 which is the first input pulse for the second cycle of operation of stage 37. No output is developed at terminals 133 and stage 38 remains with core 68 at "0" and core 72 at a "1." The ninth input pulse affects no part of the circuit beyond cores 40 and 44 in the case of the seventh pulse.

The tenth input pulse causes conduction of transistor 79 and the resultant output at terminals 132. This provides the second input pulse of the second cycle of operation of stage 37, in response to which an output pulse appears across terminals 133. This pulse is the second input pulse applied to binary trigger stage 38, and transistor 87 conducts, setting core 76 to a "1" and producing an output pulse at terminals 39. The circuit, therefore, has produced a single pulse at output terminals 39 for ten pulses applied to input terminals 35.

Conduction of transistor 87 during generation of the output pulse pulls current from reference potential through diode 114, resistor 113, winding 55 on core 52, lead 130, winding 75 on core 72 and lead 127 thereby resetting both cores 52 and 72 to "0." As is apparent from consideration of the circuit then, after termination of the output pulse, all cores will have been reset to the "0" state, and the circuit is conditioned for another cycle of operation.

It can be seen from the foregoing that by interconnecting several of the novel binary triggers shown in FIG. 1, a counter is produced using fewer stages and operating more efficiently and rapidly than any heretofore known. A stage producing a "4-2-2-2" output is easily derived from the basic binary trigger by the addition of but a single core and associated windings. It is also evident, that the technique disclosed hereinabove may be adapted to count varying numbers of pulses.

It is to be understood that transistors of other types may be substituted for those shown with appropriate changes in polarity.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A circuit for producing an output pulse in response to a plurality of input pulses comprising in combination, a plurality of signal translating devices each having two stable operating conditions, said devices normally being in the same first of said conditions, each of said devices producing an output pulse upon being switched from one condition to another, means supplying input pulses to all of said devices simultaneously and in like phase to switch said devices from said first condition to the second condition, output means for each of said devices coupled to each other for combining output pulses in opposing phase relationship, means associated with one of said devices continuously tending to maintain said one device in said first stable operating condition and to return said device to said first condition upon switching of said device in response to an input pulse, and means coupled to said device and responsive to application of a succeeding input pulse thereto to switch another of said devices back to the first of its conditions.

2. A circuit for producing an output pulse in response to a pair of input pulses comprising, first and second signal translating devices, each having two stable operating conditions, both said devices normally being in the same first of said conditions, a source of pulses, input means for said first and second translating devices coupled to said source and responsive to pulses applied thereto to switch its respective device from said first condition to a second condition, output means for each of said translating devices responsive to switching of its respective device to its second condition for developing a potential, means connecting said output means of said respective devices to each other in opposing phase relationship whereby potentials simultaneously developed in both said output means will cancel, means connected to one of said translating devices to return it to its first condition at the conclusion of each pulse applied thereto, and means responsive to switching of said one of said translating devices by every other pulse applied thereto to return the other of said translating devices to its first condition.

3. The circuit of claim 2 above wherein each of said translating devices comprises a magnetic core element having two distinct states of substantial remanence.

4. A binary trigger comprising first, second and third magnetic elements, each having two distinct states of substantial remanence, input, output and additional windings for each of said magnetic elements, said input windings of said first and second magnetic elements being connected in series-aiding relationship, said output windings of said first and second magnetic elements being connected in series-bucking relationship, an amplifier having an input and an output, means coupling said output windings of said first and second magnetic elements to the input of said amplifier, means coupling the output of said amplifier to said input winding of said third magnetic element and to said additional windings of said first and second magnetic elements, a source of potential, and means coupling said source to said additional windings of said first and third magnetic elements.

5. The circuit of claim 4 above wherein said amplifier comprises a transistor.

6. The combination of claim 4, further comprising a fourth magnetic element having two distinct states of substantial remanence, input, output and additional windings for said fourth magnetic element, means connecting said input windings of said third and fourth magnetic elements in series-aiding relationships, and means connecting said output windings of said third and fourth magnetic elements in series-bucking relationship whereby an output pulse is produced for the initial four pulses supplied to the input windings of said first and second magnetic elements and for every two input pulses supplied thereafter.

7. The combination of claim 6 above, further comprising a pair of binary counters connected in cascade, means connecting the output windings of said third and fourth magnetic elements to the input of the first of said pair of counters, and means connecting the second of said pair of counters to said additional windings of said fourth magnetic element whereby upon generation of an output pulse at said second counter, the entire circuit is returned to its initial condition.

8. A decimal counter comprising three binary triggers as defined in claim 4, the output windings of said third magnetic elements of the first and second triggers being connected to said input windings of said first and second magnetic elements of said second and third binary triggers respectively, a fourth magnetic element associated with said first binary trigger and having input, output and additional windings, means connecting said input winding of said fourth magnetic element in series-aiding relationship with the input winding of said third magnetic element of said first trigger, means connecting said output winding of said fourth magnetic element in series bucking relationship with the output winding of said third magnetic element of said first trigger, and means coupling said additional winding of said fourth magnetic element in series with the additional winding of said second magnetic element of said third trigger.

9. A decimal pulse counter including, a first stage for producing an output pulse in response to the fourth, sixth, eighth and tenth input pulses supplied thereto, a second stage for producing an output pulse in response to each pair of input pusles applied thereto connected to receive the output of said first stage, a third stage similar to said second stage connected to receive the output of said second stage to produce an output pulse for every ten input pulses supplied to said first stage, each of said first, second and third stages comprising, a pair of signal translating devices each being capable of being switched between two stable conditions, means to supply input pulses to each of said devices in like phase relationship, output means for each of said devices coupled to each other for combining output pulses in opposing phase relationship, and means associated with one of said devices continuously tending to maintain said one device in a particular one of said stable conditions.

10. A binary counter comprising, first and second magnetic cores, each having two stable operating conditions, both of said cores normally being in the same first of said conditions, input, output, and additional windings for each of said cores, said input windings being connected in series-aiding relationship, said output windings being connected in series-bucking relationship, a source of pulses connected to said input windings to switch said cores from said first condition to a second condition, an amplifier having an input and an output, means connecting said output windings to the input of said amplifier, a source of unidirectional potential, means coupling said source to said additional winding of said first core to return said core to its first state at the conclusion of each input pulse, and means coupling the output of said amplifier to the additional winding of said second core to return said second core to its first state in response to every second input pulse.

References Cited in the file of this patent

UNITED STATES PATENTS

| | | |
|---|---|---|
| 2,695,993 | Haynes | Nov. 30, 1954 |
| 2,801,344 | Lubkin | July 30, 1957 |
| 2,824,697 | Pittman et al. | Feb. 25, 1958 |